Figure 4:
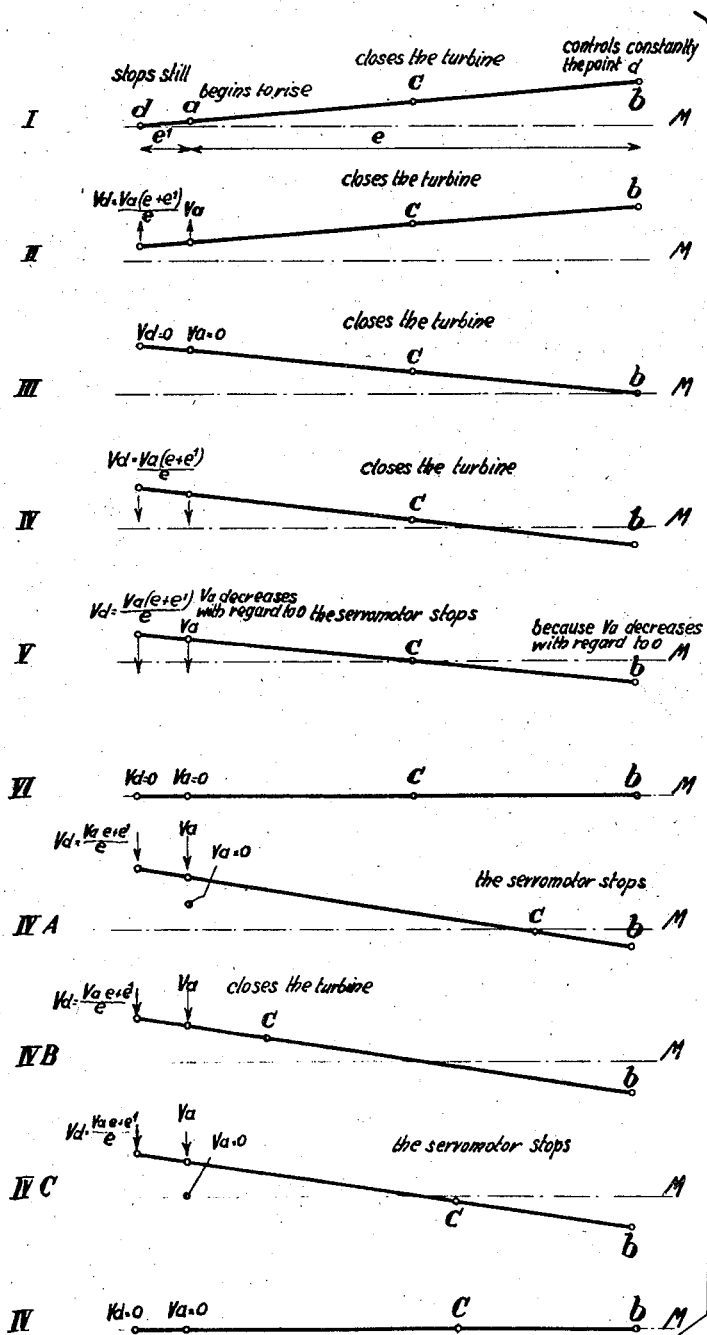

Sept. 29, 1931. J. BANGERTER 1,825,611
PRESSURE OIL GOVERNOR FOR TURBINE WHEELS
Filed Jan. 3, 1930 3 Sheets-Sheet 1
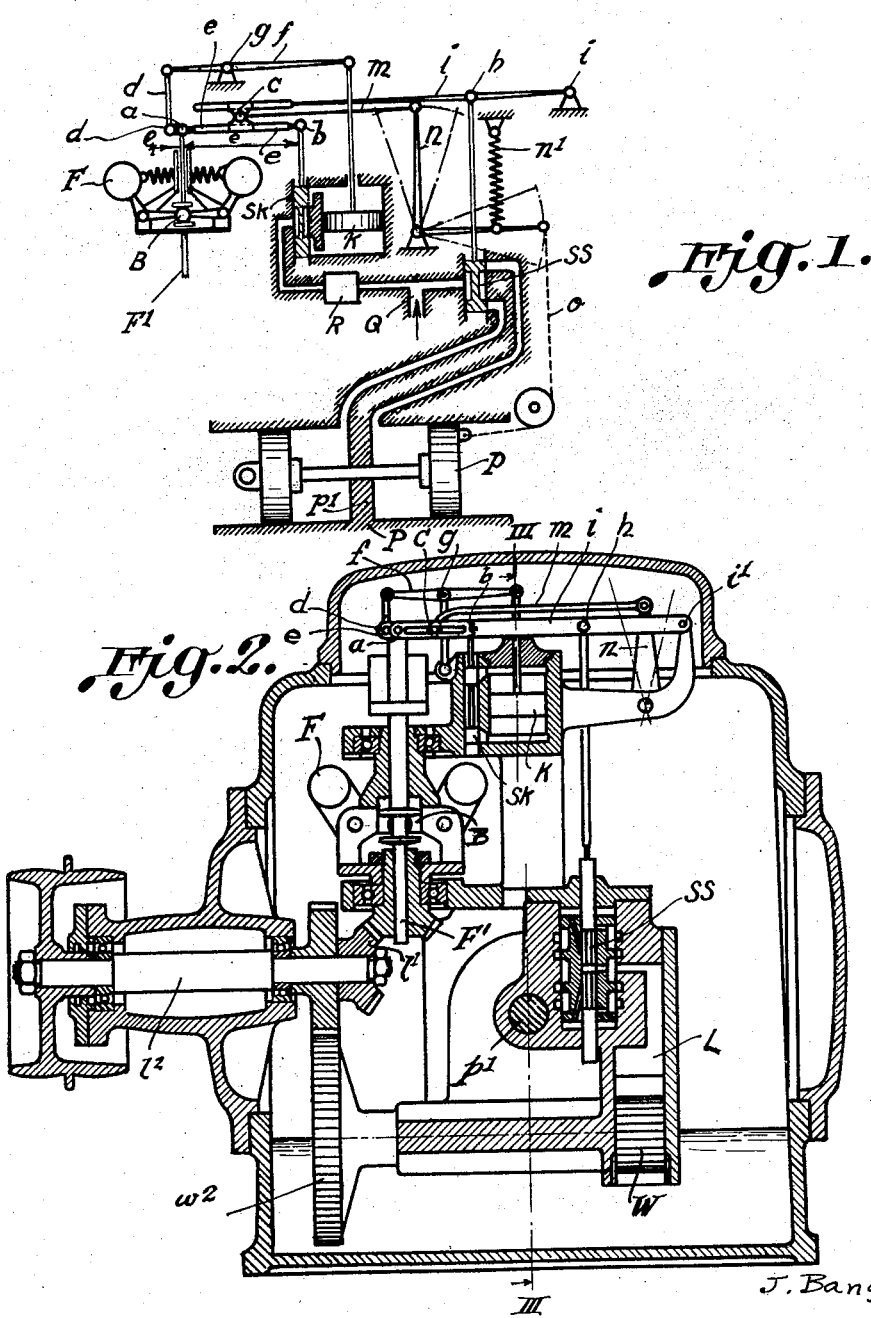

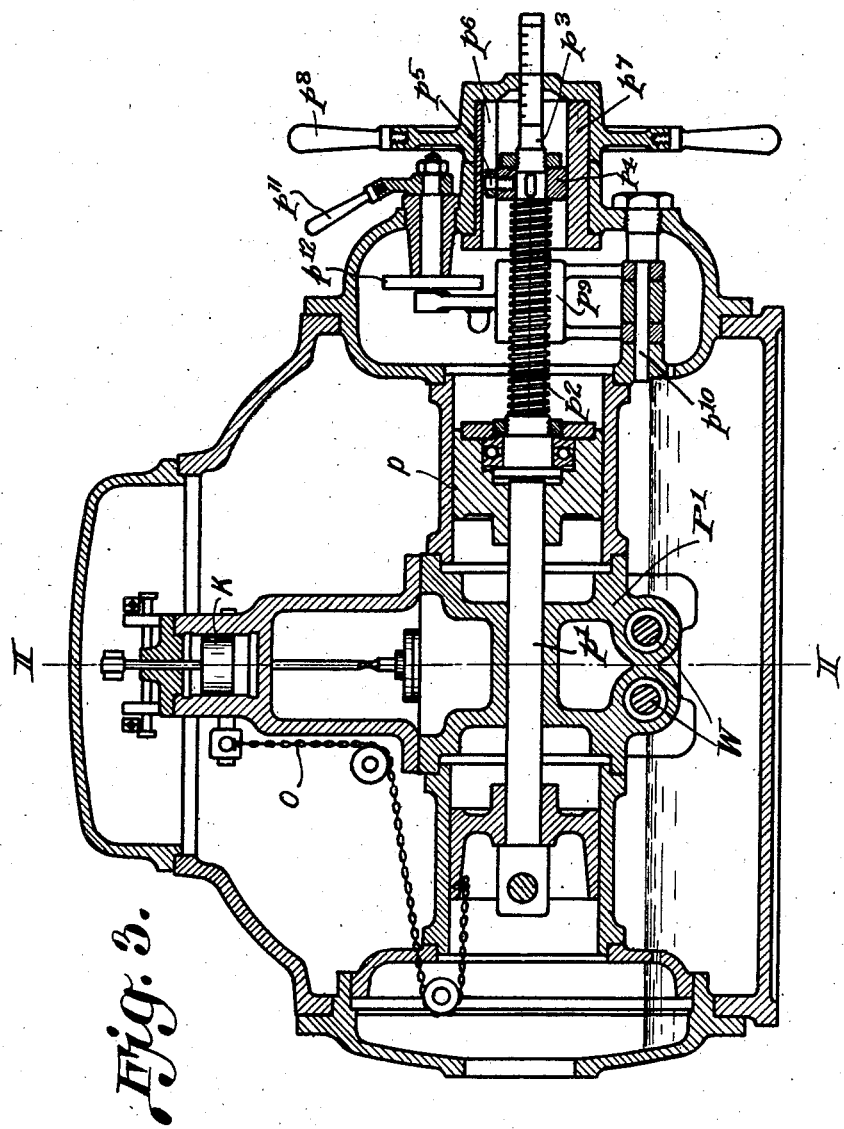

Patented Sept. 29, 1931

1,825,611

UNITED STATES PATENT OFFICE

JAKOB BANGERTER, OF BURGDORF, SWITZERLAND

PRESSURE OIL GOVERNOR FOR TURBINE WHEELS

Application filed January 3, 1930, Serial No. 418,341, and in Germany January 7, 1929.

The present invention relates to improvements in pressure oil worked controlling devices for rotary motors, especially for hydraulic turbines, in which high-speed spring governors are used as means for regulating the speed of the turbine.

In such devices it is not new to connect the sleeve of the spring governor to the piston of the servomotor used for working the admission sluice of the turbine. Also return mechanisms with auxiliary pistons have been known already for bringing the principal distributing valve back into its ineffective position, but none of these arrangements have proved quite satisfactory as to sensitiveness.

It is the object of the present invention to provide a very sensitive device and the present invention consists therefore in that a slider is slidingly arranged on a lever which is pivotally disposed between the governor sleeve and the distributing valve of the auxiliary piston working the said return and which is mechanically connected with the piston of the servomotor the distributing valve of this motor being operated by a lever connected at its one end with said slider and pivoted at the other on a stationary pivot.

By this arrangement the advantage is obtained that the speed and the direction of moving of the governor sleeve simultaneously with the casual respective position of this sleeve will both become effective on the distributing valve of the servomotor in such a way that the sensitiveness of the device will be greatly increased.

It is to be remarked that the return of the distributing valve of the servomotor into its neutral position is not obtained by the movement of this motor but by the auxiliary device expressly conceived for this purpose. This auxiliary device is controlled by the spring governor and the rapidity with which it works is dependent on the rapidity of the change of speed of the turbine. The existing mechanical connection of the auxiliary device with the servomotor does not cause a return of the distributing valve of the same into the neutral position but brings the rapidity of regulating into dependence on the respective opening of the admission valve of the turbine.

The device for obtaining a stability is therefore independent of the rapidity of the regulating process wherefore an extraordinary stability may be imparted to the device without impairing its sensitiveness.

The annexed drawings represent a working example of the controlling device according to the present invention. Therein is:

Fig. 1 a diagammatical general view in elevation,

Fig. 2 a sectional elevation of the working example on line II—II of the Fig. 3, Fig. 3 a sectional elevation on line III—III of the Fig. 2, and Fig. 4 a series of diagrams showing the successive positions taken by said lever pivotally arranged between the governor sleeve and the distributing valve of the auxiliary piston.

Similar letters of reference refer to similar parts.

Referring to Figs. 1 to 3 of the drawings the vertically arranged spindle $F^1$ of the spring governor F is driven by means of bevel gears $l^1$ from the counter shaft $l^2$ which drives also the oil pump W by means of a couple of spur wheels $w^2$.

The sleeve B of said governor is hinged at $a$ to a lever $e$ somewhere between the ends of this lever which with the end of its shorter arm at $d$ is linked to a lever $f$ and with its longer arm at $b$ to the distributing valve SK of an auxiliary piston $k$. This piston is hinged to the still free end of lever $f$ which is supported by the stationary pivot $g$. A slider $c$ mounted on the lever $e$ is attached by a link $m$ to a spring-operated bell crank lever $n$ which is connected by a rope $o$ to the double-piston $p$ of the servo-motor P. The position of slider $c$ depends therefore on the position of the pistons $p$ and spring $n^1$ will always keep the rope $o$ taut and have the tendency to move the slider $c$ towards the end $d$ of lever $e$.

While one of the pistons $p$ of the servomotor is attached to the rope $o$ and by means not shown to the admission valve of the turbine the other of the pistons is coupled to a screw spindle $p^2$ which on a lengthening $p^3$ carries a head $p^4$ adapted to move with a tooth $p^5$ in a slot $p^6$ of a cap $p^7$ held rotatably in the frame and provided with handles $p^8$. With this device the pistons of the servomotor may be moved by hand and a graduated portion of said lengthening extended to the outside of the frame indicates the amount of the displacing of the pistons (Fig. 3).

There is also a clamping device for blocking the screw-spindle $p^2$. This device comprises tongs $p^9$ mounted on a spindle $p^{10}$ held fast in the frame. These tongs may be operated by means of a handle $p^{11}$ and a swivelled double claw $p^{12}$ so as to clutch or to release the screw spindle $p^2$ (Fig. 3).

The cylinders wherein the two pistons of the servomotor are moving are separated by a partition P' and passageways lead to the valve chest $k^1$ of the motor. The distributing valve SS of this motor is linked at $h$ to a lever $i$ pivoted at one end on the stationary pivot $i^1$ and held with its other end slidingly by the slider $c$.

The pressure oil is admitted through a passageway Q and branchings lead therefrom to the two valve chests of the auxiliary piston and to that of the servomotor and a regulating valve R is inserted into the branching leading to the valve chest of the auxiliary piston.

The working of this pressure regulator is as follows: (Compare Fig. 1 where the position of rest is shown.)

It is supposed that the velocity of the turbine to be regulated has increased so that the sleeve of the spring governor F is rising. The rising of the point $a$ will at first cause the rising of the point $b$ because lever $e$ will pivot at the end of link $d$. By the rising of point $b$ however the auxiliary distributing valve SK will be operated so that a sinking of piston $k$ and thereby a rising of the point $d$ will be effected. By the rising of point $d$ however lever $e$ will swing around point $a$ and will lower the point $b$ again. Now it may be easily seen, that point $b$ will come into a position of rest whenever the piston $k$ imparts a velocity to the point $d$ which is:

$$V_d = V_a \frac{(l + l_1)}{l},$$

where $V_a$ is the velocity of point $a$, and $l_1$, $l_2$ the lengths of the arms of lever $e$. (See Fig. 1.) Whenever $V_d$ tries to differ from this value the point $b$ will be displaced so that the auxiliary distributing valve SK will correct correspondingly the velocity $V_d$ of the point $d$. If the velocity of the turbine decreases quite the same proceedings will take place only in a reversed direction.

In considering more closely this regulating process we suppose for the sake of simplicity that the slider $c$ remains stationary in a median position between $a$ and $b$. The displacing of $c$ shall be considered later on. It be also supposed that the turbine turns with increasing velocity. Then the whole system will pass in turn through the following positions (see Fig. 4):

*Diagram I.*—The point $a$ begins to rise and since point $d$ is held fast by piston $k$ lever $e$ will swing around this point $d$. The slider $c$ and point $b$ will be raised thereby and this with a greater velocity than $a$ owing to the arrangement of the leverage (see diagram I in Fig. 4).

*Diagram II.*—By the sinking of piston $k$ point $d$ will be raised and $b$ comes into the position in which the auxiliary distributing valve SK imparts to point $d$ $$\text{the velocity} = V_d = V_a \frac{(l + l_1)}{l}.$$

But effectively $V_a$ will change during the regulating process and the position of $b$ will correct itself constantly.

*Diagram III.*—Since under I and II the slider $c$ was raised, the distributing valve of the servo-motor was operated in a closing tendency so that the turbine reaches its maximum velocity and the sleeve B has arrived at a maximum height, it stops and sinks again in order to move towards the median position. The diagram III shows the position at the moment when the sleeve B is at rest, in its highest position, that is at the moment when the movement of this sleeve is reversed.

*Diagram IV.*—Now sleeve B sinks. It is still above the median position but since point $a$ is sinking faster than point $d$ the auxiliary distributing valve SK has displaced itself beneath its median position.

*Diagram V.*—When point $b$ is beneath the median position and point $a$ above it and if point $a$ continues sinking it will happen that $c$ arrives at a median position in spite of point $a$ being still above the same. As soon as slider $c$ has arrived at the median position the pistons of the servomotor P will be stopped (diagram VI).

If it is supposed now that this median position of the servomotor pistons be corresponding exactly with the normal number of revolutions of the turbine then the following will happen: The governor sleeve sinks always slower towards its median position and finally stops in this position. But when the sleeve comes to a stop also the auxiliary distributing valve SK has assumed its median position. Under the supposition that the position of the pistons $p$ of the servomotor P at the moment when slider $c$ has assumed its median position corresponds to the normal number of revolutions of the turbine the last part of the regulating process will be as follows:

The sleeve B sinks slowly back into its median position. Point $d$ follows the movement of $a$ and assumes likewise its median position. Point $b$ rises into the median position and arrives there as soon as point $a$ has come to a stop. Then $V_a=0$ and $V_d=0$. The servo-motor did not participate in this last action and remained immovable.

In the above made consideration we supposed that at the moment when slider $c$ arrives at its median position the pistons $p$ of the servo-motor be just in a position corresponding with the normal number of revolutions. If this slider $c$ is always in the middle between $a$ and $b$ this will only be true for a certain load of the turbine. But now it will be possible by adjusting the slider $c$ between $a$ and $b$ to satisfy the supposition made in the above also for different loads of the turbine, namely that there be for each load of the turbine one position of the slider $c$ in which this slider after the complete regulating will not be forced again from its median position but in which the whole lever gear will rather swing around the slider and assume its median position without displacing the slider.

This position can only be found by practical test. According to the result obtained by test the slider $c$ must be connected mechanically with the pistons of the servomotor in such a way that for each opening step the slider assumes the position which has been found the best. The mechanical connection may be made in any desirable way for instance by a system of levers and ropes, as shown, in Fig. 1 or otherwise.

The last diagrams of Fig. 4 relate to different stages of adjusting the position of slide $c$.

*Diagram IVA.*—In the diagram IVA slider $c$ is shown in a position very near point $b$. The pistons of the servo-motor will come to stop when the governor sleeve B is still too high. Then this sleeve will sink automatically unto the marked position $V_a=0$. The turbine runs still too fast and a new regulating process in a closing direction must begin.

*Diagram IVB.*—In the diagram IVB the slider $c$ is shown too near to point $a$. The servo-motor will come too much into the closing-position so that it must be opened again afterwards because the governor sleeve has sunk below the median position.

*Diagrams IVC and IVD.*—In the diagrams IVC and IVD slider $c$ is shown in its true position. The sleeve B will come to stop just in the median position.

In this regulating process considered the whole lever gear has assumed in turn the positions of the diagrams I, II, III and IV and during this the piston of the servo-motor has moved always in the closing direction.

In diagram IV the servo-motor came to stop in spite of the sleeve B being still above the median position. By the closing movement of the servo-motor the slider $c$ was brought into that position between $a$ and $b$ in which the governor valve of the servo-motor was no more displaced by the further sinking of $a$ and $d$ and by the remounting of $b$ into the median position, because the system swings around slider $c$ until the sleeve has returned into its median position.

It results from these considerations that the described governor possesses the excellent quality to act effectively upon the governor valve already at small oscillations of the governor sleeve and inversely that by the system of levers and the auxiliary piston the piston of the servo-motor is arrested at the good moment and that so the tedious tilting of the piston of the servo-motor about the position of equilibrium is avoided almost entirely. From the diagrammatic drawing in Fig. 1 it results also that the governor regulates the constant number of revolutions and this without any special device. The point $k$ is immovable and the point $h$ assumes always the same position when the servo-motor stops.

What I claim as new is:

1. In a pressure oil governor for turbine wheels and other rotatory motors and in combination, a spring-governor and a sleeve forming part of the same all mounted on a vertical axle, a piston of a servomotor and a distributing valve combined with the same, a piston of an auxiliary motor guided in a vertical cylinder and a distributing valve combined therewith, passage ways for pressure oil communicating with the chest of said two distributing valves, a pair of levers establishing the operative connection between the governor sleeve and the auxiliary motor and comprising a first lever hinged between its ends to the governor sleeve and at one end to the distributing valve of the auxiliary motor and a second lever pivoted between its ends and linked to the other end of the first lever and to the piston of the auxiliary motor and a second pair of levers establishing the dependency of the servomotor on the movements of the said first lever and comprising one pivoted lever arm linked near its middle portion to the distributing sleeve of the servomotor and supported with its free end by said first lever and a pivoted bell-crank lever linked with one arm to the supporting member of the first lever of the second pair of levers and a spring attached to the bell crank cover and adapted to effect the return movement of the piston of the servomotor, the whole for the purpose set forth.

2. In a pressure oil governor for turbine wheels and other rotatory motors and in combination, a spring-governor and a sleeve forming part of the same all mounted on a distributing valve combined with the same, a piston of an auxiliary motor guided in a vertical cylinder and a distributing valve combined therewith, passage ways for pressure oil communicating with the chest of said two distributing valves, a pair of levers establishing the operative connection between the governor sleeve and the auxiliary motor and comprising a first lever pivoted on the sleeve axle and hinged with one end to the valve stem and linked with the other to a second lever pivoted near its middle and hinged to the piston rod, a slider guided on said first lever, a pivoted arm hinged to the valve stem of the servomotor and slidingly attached to said slider and a spring controlled bell-crank-lever attached to the piston of the servomotor and linked to said slider the whole with a view of basing the control of the servomotor on the movements of the said system of levers of the auxiliary motor.

In testimony whereof I affix my signature.

JAKOB BANGERTER.